US012686360B2

(12) United States Patent
Yan

(10) Patent No.: US 12,686,360 B2
(45) Date of Patent: Jul. 21, 2026

(54) VEHICLE ANTI-THEFT METHOD AND VEHICLE ANTI-THEFT SYSTEM

(71) Applicant: Robert Bosch GmbH, Stuttgart (DE)

(72) Inventor: Wei Yan, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 18/779,261

(22) Filed: Jul. 22, 2024

(65) Prior Publication Data

US 2025/0042361 A1 Feb. 6, 2025

(30) Foreign Application Priority Data

Aug. 1, 2023 (CN) .......................... 202310960824.2

(51) Int. Cl.
B60R 25/24 (2013.01)
B60R 25/06 (2006.01)
B60R 25/08 (2006.01)

(52) U.S. Cl.
CPC .............. B60R 25/24 (2013.01); B60R 25/06 (2013.01); B60R 25/08 (2013.01)

(58) Field of Classification Search
CPC ..... B60R 25/086; B60R 25/246; B60R 25/06; B60R 25/08; B60R 25/24; B60R 2325/108
USPC ......... 701/48, 32.6, 164, 177; 303/3, 15, 20, 303/89; 340/5.1, 5, 21, 6.22, 340/426.11–426.18; 307/10.1–10.6
See application file for complete search history.

(56) References Cited

U.S. PATENT DOCUMENTS

| | | | | |
|---|---|---|---|---|
| 5,575,544 A * | 11/1996 | Hasegawa | .............. | H04B 1/082 439/153 |
| 6,329,909 B1 * | 12/2001 | Siedentop | ............... | B60R 25/24 340/425.5 |
| 7,164,213 B2 * | 1/2007 | Yoshimura | ......... | G07C 9/00309 340/5.1 |
| 11,418,346 B2 * | 8/2022 | Oh | ........................ | H04L 9/3231 |
| 11,516,191 B2 * | 11/2022 | Wang | ...................... | H04L 63/10 |

(Continued)

FOREIGN PATENT DOCUMENTS

| | | |
|---|---|---|
| CN | 101559745 A | 10/2009 |
| CN | 103303255 A | 9/2013 |

(Continued)

*Primary Examiner* — Logan M Kraft
*Assistant Examiner* — Johnny H Hoang
(74) *Attorney, Agent, or Firm* — Maginot, Moore & Beck LLP

(57) ABSTRACT

An vehicle anti-theft method and a vehicle anti-theft system is disclosed. The vehicle anti-theft method is implemented by at least a vehicle electronic anti-theft system, a chassis electronic control unit and an electronic parking brake. The method includes (i) generating, by the chassis electronic control unit, a random number, and sending the random number to the vehicle electronic anti-theft system, (ii) between the chassis electronic control unit and the vehicle electronic anti-theft system, based on the random number and PIN and secret key parameters initially configured in the chassis electronic control unit and the vehicle electronic anti-theft system, performing an anti-theft authentication, and obtaining an anti-theft authentication result, and (iii) based on the anti-theft authentication result, controlling, by the electronic parking brake, whether to unlock wheel calipers.

17 Claims, 4 Drawing Sheets

(56) References Cited

U.S. PATENT DOCUMENTS

| | | | | |
|---|---|---|---|---|
| 2015/0252770 A1* | 9/2015 | Books | ................... | B60W 10/08 |
| | | | | 701/99 |
| 2018/0205729 A1* | 7/2018 | Carlesimo | ........... | H04W 12/043 |
| 2019/0061687 A1* | 2/2019 | Khalil | ................. | B60R 25/2072 |
| 2023/0286462 A1* | 9/2023 | Oh | ........................ | B60T 13/741 |

FOREIGN PATENT DOCUMENTS

| | | | |
|---|---|---|---|
| CN | 112248966 A | 1/2021 |
| CN | 113200019 A | 8/2021 |
| DE | 60 2006 001 007 T2 | 7/2009 |
| EP | 0 653 338 A1 | 5/1995 |
| JP | 2000-108848 A | 4/2000 |

* cited by examiner

1

VEHICLE ANTI-THEFT METHOD AND VEHICLE ANTI-THEFT SYSTEM

This application claims priority under 35 U.S.C. § 119 to patent application no. CN 2023 1096 0824,2, filed on Aug. 1, 2023 in China, the disclosure of which is incorporated herein by reference in its entirety.

The present disclosure relates to a vehicle anti-theft technology, particularly relates to a vehicle anti-theft method and a vehicle anti-theft system.

BACKGROUND

In an existing vehicle anti-theft system, a chassis electronic control unit is not included. In addition, during the after-sales vehicle part replacement, there is a problem of illegal part replacement of the chassis electronic control unit. Therefore, there is a certain theft risk and a potential security hole.

SUMMARY

Based on the above problems in the prior art, the present disclosure aims to provide a vehicle anti-theft method and a vehicle anti-theft system which are higher in safety and reliability.

The vehicle anti-theft method in one aspect of the present disclosure is implemented by at least a vehicle electronic anti-theft system, a chassis electronic control unit, and an electronic parking brake; and the method comprises the following steps:

a random number generation step, wherein the chassis electronic control unit generates a random number and sends the random number to the vehicle electronic anti-theft system;

an anti-theft authentication step, wherein between the chassis electronic control unit and the vehicle electronic anti-theft system, based on the random number and PIN and secret key parameters initially configured in the chassis electronic control unit and the vehicle electronic anti-theft system, an anti-theft authentication is performed, and an anti-theft authentication result is obtained; and an anti-theft control step, wherein the chassis electronic control unit controls whether the electronic parking brake unlocks wheel calipers based on the anti-theft authentication result.

A vehicle anti-theft system in one aspect of the present disclosure at least comprises: a vehicle electronic anti-theft system, a chassis electronic control unit, and an electronic parking brake, wherein the chassis electronic control unit comprises:

a first configuration module for initially configuring PIN and secret key parameters;

a random number generation module for generating a random number and sending the random number to the vehicle electronic anti-theft system;

a first anti-theft authentication module that performs anti-theft authentication actions across the vehicle electronic anti-theft system based on the random number and the PIN and secret key parameters initially configured in the first configuration module, and obtains an anti-theft authentication result; and an anti-theft result output module for outputting the anti-theft authentication result, the vehicle electronic anti-theft system comprises:

a second configuration module for initially configuring PIN and secret key parameters;

a random number receiving module for receiving the random number from the chassis electronic control unit; and a second anti-theft authentication module that performs anti-theft authentication actions across the chassis electronic control unit based on the random number and the PIN and secret key parameters initially configured in the second configuration module, the electronic parking brake comprises:

a first anti-theft result receiving module for receiving the anti-theft authentication result from the chassis electronic control unit; and a first anti-theft control module for controlling whether the electronic parking brake unlocks wheel calipers based on the anti-theft authentication result.

According to the vehicle anti-theft method and the vehicle anti-theft system of the present disclosure, a higher level of anti-theft encryption and security can be achieved by adding the chassis electronic control unit to an existing anti-theft system.

BRIEF DESCRIPTION OF THE DRAWINGS

The foregoing and other objectives and advantages of the present application will become more fully apparent from the following detailed description taken in conjunction with the accompanying drawings, in which identical or similar elements are denoted by the same reference numerals.

DETAILED DESCRIPTION

Some of the examples of the present disclosure are described below with the aim of providing a basic understanding of the present disclosure. It is not intended to identify the key or decisive elements of the present disclosure or to define the scope to be protected.

For brevity and illustrative purposes, the principles of the present disclosure are mainly described herein with reference to its exemplary examples. However, those skilled in the art will readily recognize that the same principles may be applied equally to lane line detection methods and lane line detection systems for all types of lane line detection, in addition, these same principles may be implemented therein, and any such changes do not deviate from the true spirit and scope of the present patent application.

Also, in the following description, reference is made to the accompanying drawings, which illustrate specific exemplary examples. Electrical, mechanical, logical and structural changes may be made to these examples without departing from the spirit and scope of the present disclosure. Further, although the features of the present disclosure are disclosed in combination with only one of a plurality of implementations/examples, if it may be desirable and/or advantageous for any given or identifiable function, the features may be combined with one or more other features of other implementations/examples. Accordingly, the following description shall not be considered in a limiting sense, and the scope of the present disclosure is defined by the appended Claims and their equivalents.

Terms such as "have" and "comprise" indicate that, in addition to the units (modules) and steps that are directly and explicitly expressed in the Specification and the Claims, the technical solution of the present disclosure does not preclude the cases of other units (modules) and steps that are not directly or explicitly expressed.

Figure 1:
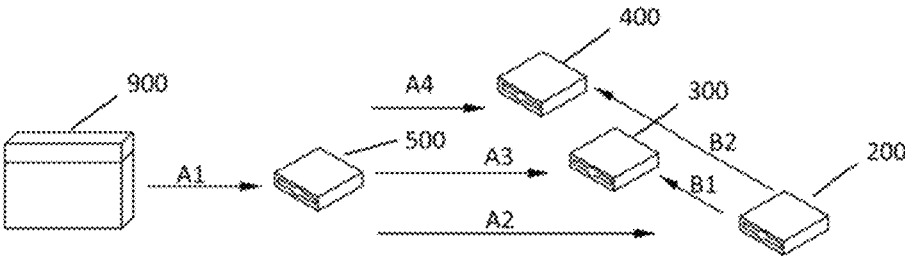
FIG. 1 is a structure schematic diagram of a vehicle anti-theft system according to an embodiment of the present disclosure.

FIG. 1 is a structure schematic diagram of a vehicle anti-theft system according to an embodiment of the present disclosure.

As shown in FIG. 1, the vehicle anti-theft system of an embodiment of the present disclosure comprises: a vehicle electronic anti-theft system (IMMO) 100, a chassis electronic control unit (Chassis ECU) 200, a transmission electronic control unit (Transmission ECU) 300, and a powertrain electronic control unit (Powertrain ECU) 400.

First, an initial parameter configuration of the vehicle anti-theft system of an embodiment of the present disclosure is illustrated.

As shown in FIG. 1, the initial parameter configuration comprises the following steps:

A1: the original equipment manufacturer (OEM) 900 injects VIN information of terminal production line (EOL) equipment into the vehicle electronic anti-theft system 100, calculates a corresponding unique PIN, and writes the PIN into the vehicle electronic anti-theft system 100 through, for example, diagnostic commands; the vehicle electronic anti-theft system 100 generates corresponding secret key (SK) parameters;

A2: a security algorithm is used between the vehicle electronic anti-theft system 100 and the chassis electronic control unit 200 for writing the PIN and the SK parameters into the chassis electronic control unit 200, so as to complete a configuration of the chassis electronic control unit 200;

A3: a security algorithm is used between the vehicle electronic anti-theft system 100 and the transmission electronic control unit 300 for writing the PIN and the SK parameters into the transmission electronic control unit 300, so as to complete a configuration of the transmission electronic control unit 300;

A4: a security algorithm is used between the vehicle electronic anti-theft system 100 and the powertrain electronic control unit 400 for writing the PIN and the SK parameters into the powertrain electronic control unit 400, so as to complete a configuration of the powertrain electronic control unit 400.

Secondly, a parameter reconfiguration action when the transmission electronic control unit 300 and the powertrain electronic control unit 400 are updated is illustrated.

As shown in FIG. 1, the parameter reconfiguration action comprises:

B1: the chassis electronic control unit 200 is used as master equipment, a diagnostic access algorithm is used for transmitting the PIN and SK information to the transmission electronic control unit 300 as slave equipment, thereby completing a parameter reconfiguration of the transmission electronic control unit 300;

B2: the chassis electronic control unit 200 is used as master equipment, a diagnostic access algorithm is used for transmitting the PIN and SK information to the powertrain electronic control unit 400 as slave equipment, thereby completing a parameter reconfiguration of the powertrain electronic control unit 400, wherein the order of B1 and B2 is not defined. In addition, the above parameter reconfiguration action generally occurs in, for example, after-sales 4S stores.

Figure 2:
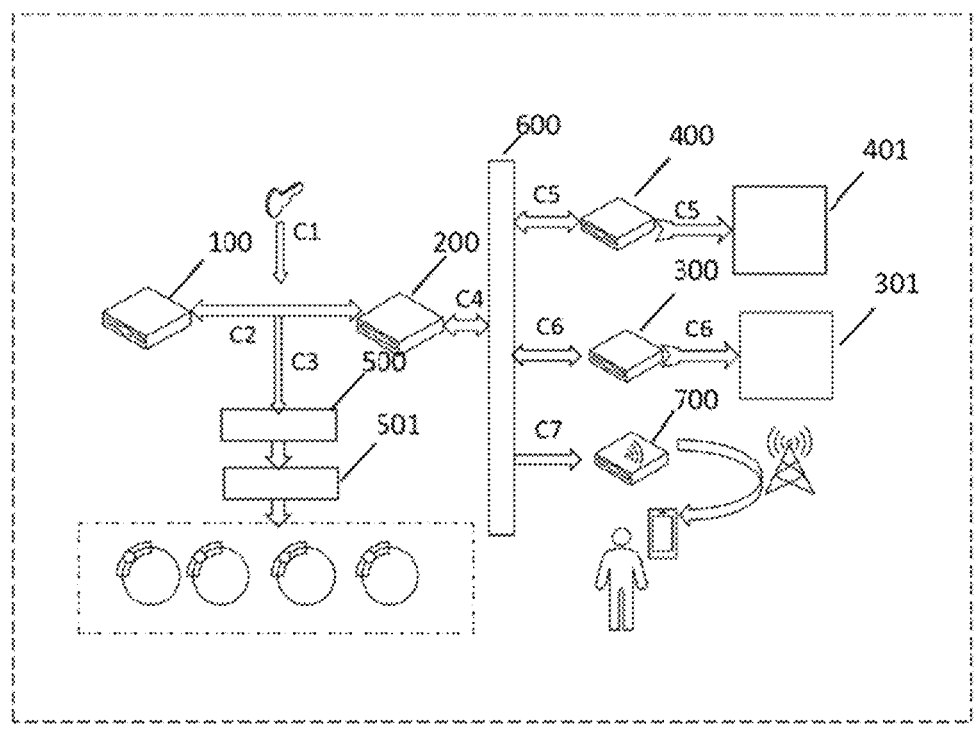
FIG. 2 is a schematic diagram illustrating anti-theft actions executed in a vehicle anti-theft system of an embodiment of the present disclosure.

FIG. 2 is a schematic diagram illustrating anti-theft actions executed in a vehicle anti-theft system of an embodiment of the present disclosure.

As shown in FIG. 2, authentication and anti-theft actions implemented in the vehicle anti-theft system of one embodiment of the present disclosure comprise:

C1: vehicle starting;

C2: the chassis electronic control unit 200 checks an initial configuration (checks if PIN and SK parameters are initially configured) and generates a random number, the random number is sent to the vehicle electronic anti-theft system 100, and the vehicle electronic anti-theft system 100 performs a combined calculation of the received random number and the initially configured PIN and SK parameters, obtains a first anti-theft parameter value, and returns the first anti-theft parameter value to the chassis electronic control unit 200;

C3: the chassis electronic control unit 200 calculates to obtain a second anti-theft parameter value based on the initially configured PIN and SK parameters and the generated random number, and judges whether the first anti-theft parameter value and the second anti-theft parameter value returned from the vehicle electronic anti-theft system 100 are the same; it is considered to be a successful anti-theft authentication (i.e. the authentication result is trusted) if the first anti-theft parameter value and the second anti-theft parameter value are the same, and instructions for unlocking wheels can be sent to calipers 501 through the electronic parking brake 500; and it is considered to be an unsuccessful anti-theft authentication (i.e. the authentication result is not trusted) if the first anti-theft parameter value and the second anti-theft parameter value are not the same, and instructions of not releasing the calipers 501 to lock the wheels are sent through the electronic parking brake 500

C4: the chassis electronic control unit 200 sends the authentication result to the powertrain electronic control unit 400 and the transmission electronic control unit 300 through a bus 600;

C5: if the authentication result is in an untrusted state, the powertrain electronic control unit 400 limits power output of an engine 401 and enables a safety limit power transmission function; and if the authentication result is in a trusted state, the previous power is maintained;

C6: if the authentication result is in an untrusted state, the transmission electronic control unit 300 limits power transmission of a transmission 301 and enables a safety limit power transmission function; and if the authentication result is in a trusted state, the previous transmission is maintained;

C7: if the authentication result is in an untrusted state, a T-BOX (Communications Box) 700 sends an illegal access risk to an application program over the network and sends a prompt to a cell phone of a user; and if the authentication result is in a trusted state, no warn is sent, and the state is safe.

One specific example of the vehicle anti-theft method of the present disclosure is described below.

Figure 3:
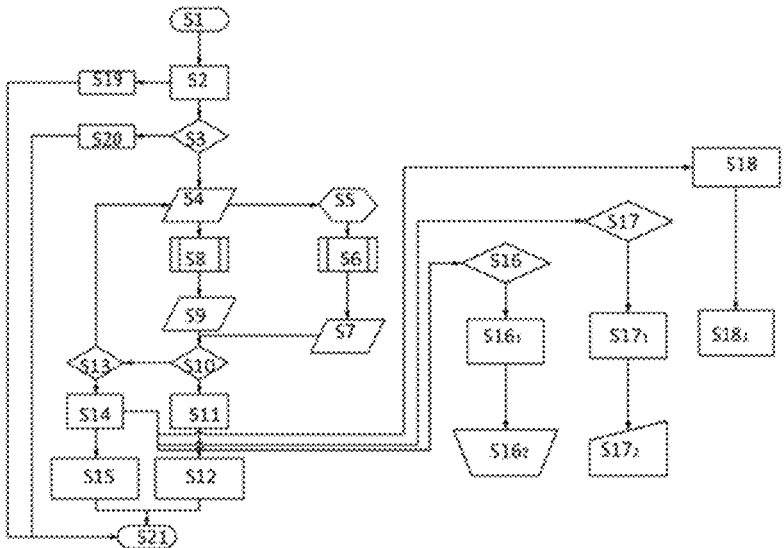
FIG. 3 is a flow chart of one specific example of the vehicle anti-theft method of the present disclosure.

FIG. 3 is a flow chart of one specific example of the vehicle anti-theft method of the present disclosure.

As shown in FIG. 3, one specific example of the vehicle anti-theft method of the present disclosure primarily comprises the following steps:

S1: the power is on;

S2: the chassis electronic control unit detects whether it is in an anti-theft mode; if yes, continue to S3; otherwise, skip to S19;

S3: the chassis electronic control unit checks an initial configuration, i.e., checks whether PIN and SK parameters have been initially set; if yes, continue to S4; otherwise, skip to S20;

S4: the chassis electronic control unit generates a random number;

S5: the chassis electronic control unit sends the random number to the vehicle electronic anti-theft system;

S6: the vehicle electronic anti-theft system performs anti-theft calculations based on the initially set PIN and SK parameters and the random number received from the chassis electronic control unit;

S7: the vehicle electronic anti-theft system obtains the first anti-theft parameter value through the anti-theft calculations;

S8: the chassis electronic control unit performs anti-theft calculations based on the PIN and the SK parameters and the random number generated by itself;

S9: the chassis electronic control unit obtains the second anti-theft parameter value through the anti-theft calculations;

S10: the chassis electronic control unit compares whether the first anti-theft parameter value and the second anti-theft parameter value are the same; if the first anti-theft parameter value and the second anti-theft parameter value are the same, continue to S11; otherwise, skip to S13;

S11: the anti-theft authentication is successful;

S12: the calipers are pre-released, and parking brakes are pre-unlocked;

S13: the unsuccessful number of comparisons of the first anti-theft parameter value and the second anti-theft parameter value is counted to obtain a counting value N; if N<the specified threshold, return to S4; otherwise, continue to S14;

S14: if the anti-theft authentication is unsuccessful, continue to conduct S15, and meanwhile continue to conduct S16 and its sub-steps S161-S162, S17 and its sub-steps S171 and S172, S18 and its sub-step S181;

S15: the calipers are not released, and an anti-theft alarm (e.g. flashing light, etc.) is sent;

S16: the unsuccessful anti-theft authentication result is past to the powertrain electronic control unit;

S161: if the powertrain electronic control unit receives the unsuccessful anti-theft authentication result, it means that an untrusted access is received, and a powertrain needs to be limited; S162: the power output of the engine is limited, and the safety limit power transmission function is enabled;

S17: the unsuccessful anti-theft authentication result is past to the transmission electronic control unit;

S171: if the transmission electronic control unit receives the unsuccessful anti-theft authentication result, it means that an untrusted access is received, and the transmission needs to be limited;

S172: the power transmission of the transmission is limited, and the safety limit power transmission function is enabled;

S18: the unsuccessful anti-theft authentication result is past to the T-BOX;

S181: the T-BOX receives an unsuccessful anti-theft authentication result, it means that an untrusted access is received, and an illegal access risk needs to be sent to the application program over the network;

S19: if it is in a non-anti-theft mode, skip to S21;

S20: failures of the initial configuration are reported, and skip to S21; S21: end.

Next, a specific configuration of the vehicle anti-theft system of the present disclosure is illustrated.

Figure 4:
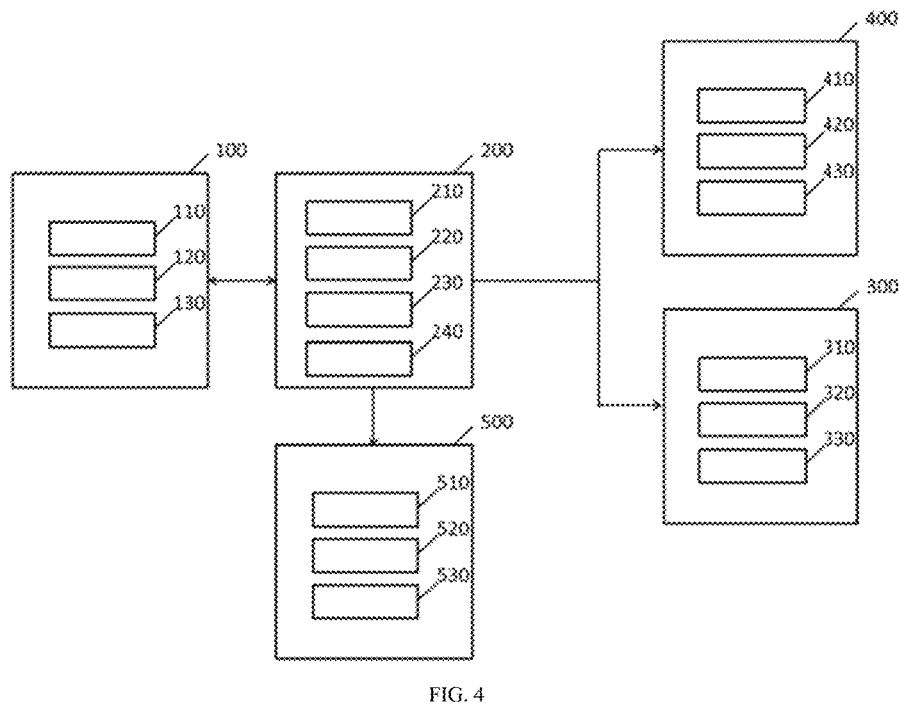
FIG. 4 is a specific structure schematic diagram of a vehicle anti-theft system according to an embodiment of the present disclosure.

FIG. 4 is a specific structure schematic diagram of a vehicle anti-theft system according to an embodiment of the present disclosure.

As shown in FIG. 4, the vehicle anti-theft system of the embodiment of the present disclosure comprises: a vehicle electronic anti-theft system 100, a chassis electronic control unit 200, a transmission electronic control unit 300, a powertrain electronic control unit 400, and an electronic parking brake 500.

The vehicle electronic anti-theft system 100 comprises:

a first configuration module 110 for initially configuring PIN and secret key parameters;

a random number receiving module 120 for receiving a random number from the chassis electronic control unit; and a first anti-theft authentication module 130 that performs anti-theft authentication actions across the chassis electronic control unit based on the random number and the PIN and secret key parameters initially configured in the first configuration module, wherein the chassis electronic control unit 200 comprises:

a second configuration module 210 for initially configuring PIN and secret key parameters;

a random number generation module 220 for generating a random number and sending the random number to the vehicle electronic anti-theft system; and a second anti-theft authentication module 230 that performs anti-theft authentication actions across the vehicle electronic anti-theft system based on the random number and the PIN and secret key parameters initially configured in the second configuration module, and obtains the anti-theft authentication result; and an anti-theft result output module 240 for outputting the anti-theft authentication result, wherein the transmission electronic control unit 300 comprises:

a third configuration module 310 for writing the PIN and the secret key parameters from the vehicle electronic anti-theft system to the transmission electronic control unit;

a third anti-theft result receiving module 320 for receiving the anti-theft authentication result from the chassis electronic control unit; and a third anti-theft control module 330 for controlling whether the power transmission of the transmission is limited based on the anti-theft authentication result and whether the safety limit power transmission function is enabled, wherein the powertrain electronic control unit 400 comprises:

a fourth configuration module 410 for writing the PIN and the secret key parameters from the vehicle electronic anti-theft system to the powertrain electronic control unit;

a fourth anti-theft result receiving module 420 for receiving the anti-theft authentication result from the chassis electronic control unit; and a fourth anti-theft control module 430 for controlling whether the power output of the engine is limited based on the anti-theft authentication result and whether the safety limit power transmission function is enabled, wherein the electronic parking brake 500 comprises:

a first anti-theft result receiving module 510 for receiving the anti-theft authentication result from the chassis electronic control unit; and a first anti-theft control module 520 for controlling whether the electronic parking brake unlocks the wheel calipers based on the anti-theft authentication result.

As stated above, the vehicle anti-theft method and the vehicle anti-theft system according to the present disclosure enable third-level anti-theft encryption when a vehicle is started by increasing the anti-theft authentication between the chassis electronic control unit and a vehicle wireless key system. Moreover, in the case of a successful anti-theft authentication, the wheel calipers are pre-unlocked through the parking brake system. In the case of an unsuccessful anti-theft authentication, the chassis electronic control unit enters the non-safety mode and stops the wheels from unlocking and the vehicle from traveling freely through the electronic parking brake. Further, the chassis electronic control unit may also pass the unsuccessful anti-theft authentication result to the powertrain electronic control unit and the transmission electronic control unit, and the unsuccessful anti-theft authentication result may also be transmitted to the user application program through the T-BOX to alert the user about the risk.

On the other hand, the vehicle anti-theft method and the vehicle anti-theft system according to the present disclosure can also solve the problem of illegal changes of the chassis electronic control unit during replacement in different vehicles in the after-sales market, so as to ensure a unique matching attribute between products and the vehicles. Moreover, when a new powertrain electronic control unit and a transmission electronic control unit are replaced, for example in a 4S store, PIN and SK information may be learned to other electronic control units based on the initial configuration of the chassis electronic control unit, and a complex reconfiguration by OEM can be avoided.

The above descriptions are only specific embodiments of the present application, and the protection scope of the present application is not limited thereto. Those skilled in the art may contemplate other feasible modifications or substitutions based on the technical scope disclosed in the present application, and all such modifications or substitutions fall within the scope of protection of the present application. Without conflicts, the embodiments of the present application and the features in the embodiments may also be combined. The scope of protection of the present application is subject to the scope of protection of the Claims.

What is claimed is:

1. A vehicle anti-theft method implemented by at least a vehicle electronic anti-theft system, a chassis electronic control unit and an electronic parking brake, the method comprising:

performing an initial configuration step in which a PIN is pre-written into the vehicle electronic anti-theft system, the vehicle electronic anti-theft system generates secret key parameters corresponding to the PIN, and the PIN and the secret key parameters are written from the vehicle electronic anti-theft system to the chassis electronic control unit;

performing a random number generation step in which the chassis electronic control unit generates a random number and sends the random number to the vehicle electronic anti-theft system;

performing an anti-theft authentication step in which an anti-theft authentication between the chassis electronic control unit and the vehicle electronic anti-theft system is performed based on the random number, the PIN, and the secret key parameters initially configured in the chassis electronic control unit and the vehicle electronic anti-theft system, the anti-theft authentication producing an anti-theft authentication result; and performing an anti-theft control step in which the electronic parking brake controls whether to unlock wheel calipers based on the anti-theft authentication result.

2. A computer readable medium having a computer program stored thereon, wherein:

the computer program, when executed by a processor, implements the vehicle anti-theft method of claim 1.

3. A computer device, comprising:

a storage module;

a processor; and a computer program stored on the storage module and capable of running on the processor, wherein the processor implements the vehicle anti-theft method of claim 1 when executing the computer program.

4. The vehicle anti-theft method of claim 1, wherein:

the vehicle anti-theft method is further implemented in a transmission electronic control unit, a powertrain electronic control unit, and the initial configuration step further comprises:

writing a PIN and secret key parameters from the vehicle electronic anti-theft system to the transmission electronic control unit; and writing the PIN and the secret key parameters from the vehicle electronic anti-theft system to the powertrain electronic control unit.

5. The vehicle anti-theft method of claim 4, further comprising:

performing a configuration updating step in which:

in the case that a configuration of the transmission electronic control unit is updated, the chassis electronic control unit is used as master equipment, and the PIN and the secret key information written into the chassis electronic control unit are transmitted to the transmission electronic control unit used as slave equipment; and in the case that a configuration of the powertrain electronic control unit is updated, the chassis electronic control unit is used as the master equipment, and the PIN and the secret key information written into the chassis electronic control unit are transmitted to the powertrain electronic control unit used as the slave equipment.

6. The vehicle anti-theft method of claim 5, wherein the anti-theft authentication step comprises:

calculating, with the vehicle electronic anti-theft system, to obtain a first anti-theft parameter value based on the received random number and the initially configured PIN and secret key parameters;

sending the first anti-theft parameter value to the chassis electronic control unit;

calculating, with the chassis electronic control unit, to obtain a second anti-theft parameter value based on the initially configured PIN and the secret key parameters;

judging whether the first anti-theft parameter value and the second anti-theft parameter value sent from the vehicle electronic anti-theft system are the same; and considering that an anti-theft authentication result is a successful anti-theft authentication if the first anti-theft parameter value and the second anti-theft parameter value are the same, and considering that the anti-theft authentication result is an unsuccessful anti-theft authentication if the first anti-theft parameter value and the second anti-theft parameter value are different.

7. The vehicle anti-theft method of claim 6, wherein the anti-theft control step comprises:

in case of a successful anti-theft authentication, controlling the electronic parking brake to release calipers to unlock wheels; or in case of an unsuccessful anti-theft authentication, controlling the electronic parking brake to not release the calipers to lock the wheels.

8. The vehicle anti-theft method of claim 7, wherein the anti-theft control step further comprises:

in case of unsuccessful anti-theft authentication, performing one or more of the following actions:

controlling the powertrain electronic control unit to limit power output of an engine and enabling a safety limit power transmission function;

controlling the transmission electronic control unit to limit power transmission of a transmission and enabling the safety limit power transmission function; and prompting an unsuccessful anti-theft authentication result to a mobile terminal corresponding to a vehicle through a T-BOX.

9. A vehicle anti-theft method implemented by at least a vehicle electronic anti-theft system, a chassis electronic control unit, a transmission electronic control unit, a powertrain electronic control unit, and an electronic parking brake, the method comprising:

performing an initial configuration step comprising:

writing a PIN and secret key parameters from the vehicle electronic anti-theft system to the transmission electronic control unit; and writing the PIN and the secret key parameters from the vehicle electronic anti-theft system to the powertrain electronic control unit;

performing a random number generation step in which the chassis electronic control unit generates a random number and sends the random number to the vehicle electronic anti-theft system;

performing an anti-theft authentication step in which an anti-theft authentication between the chassis electronic control unit and the vehicle electronic anti-theft system is performed based on the random number, the PIN, and the secret key parameters initially configured in the chassis electronic control unit and the vehicle electronic anti-theft system, the anti-theft authentication producing an anti-theft authentication result; and performing an anti-theft control step in which the electronic parking brake controls whether to unlock wheel calipers based on the anti-theft authentication result.

10. The vehicle anti-theft method of claim 9, further comprising:

performing a configuration updating step in which:

in the case that a configuration of the transmission electronic control unit is updated, the chassis electronic control unit is used as master equipment, and the PIN and the secret key information written into the chassis electronic control unit are transmitted to the transmission electronic control unit used as slave equipment; and in the case that a configuration of the powertrain electronic control unit is updated, the chassis electronic control unit is used as the master equipment, and the PIN and the secret key information written into the chassis electronic control unit are transmitted to the powertrain electronic control unit used as the slave equipment.

11. The vehicle anti-theft method of claim 10, wherein the anti-theft authentication step comprises:

calculating, with the vehicle electronic anti-theft system, to obtain a first anti-theft parameter value based on the received random number and the initially configured PIN and secret key parameters;

sending the first anti-theft parameter value to the chassis electronic control unit;

calculating, with the chassis electronic control unit, to obtain a second anti-theft parameter value based on the initially configured PIN and the secret key parameters;

judging whether the first anti-theft parameter value and the second anti-theft parameter value sent from the vehicle electronic anti-theft system are the same; and considering that an anti-theft authentication result is a successful anti-theft authentication if the first anti-theft parameter value and the second anti-theft parameter value are the same, and considering that the anti-theft authentication result is an unsuccessful anti-theft authentication if the first anti-theft parameter value and the second anti-theft parameter value are different.

12. The vehicle anti-theft method of claim 11, wherein the anti-theft control step comprises:

in case of a successful anti-theft authentication, controlling the electronic parking brake to release calipers to unlock wheels; or in case of an unsuccessful anti-theft authentication, controlling the electronic parking brake to not release the calipers to lock the wheels.

13. The vehicle anti-theft method of claim 12, wherein the anti-theft control step further comprises:

in case of unsuccessful anti-theft authentication, performing one or more of the following actions:

controlling the powertrain electronic control unit to limit power output of an engine and enabling a safety limit power transmission function;

controlling the transmission electronic control unit to limit power transmission of a transmission and enabling the safety limit power transmission function; and prompting an unsuccessful anti-theft authentication result to a mobile terminal corresponding to a vehicle through a T-BOX.

14. A vehicle anti-theft system, comprising:

a vehicle electronic anti-theft system;

a chassis electronic control unit; and an electronic parking brake, wherein:

the vehicle electronic anti-theft system is configured to:

initially configure PIN and secret key parameters;

receive a random number from the chassis electronic control unit; and perform anti-theft authentication actions across the chassis electronic control unit based on the random number and the PIN and secret key parameters initially configured by the vehicle electronic anti-theft system, the chassis electronic control unit is configured to:

initially configure PIN and secret key parameters;

generate a random number and send the random number to the vehicle electronic anti-theft system; and perform anti-theft authentication actions across the vehicle electronic anti-theft system based on the random number and the PIN and secret key parameters initially configured in the chassis electronic control unit, and obtain an anti-theft authentication result; and output the anti-theft authentication result, and the electronic parking brake is configured to:

receive the anti-theft authentication result from the chassis electronic control unit; and control whether the electronic parking brake unlocks wheel calipers based on the anti-theft authentication result.

15. The vehicle anti-theft system of claim 14, further comprising:

a transmission electronic control unit configured to:

write the PIN and the secret key parameters from the vehicle electronic anti-theft system to the transmission electronic control unit;

receive the anti-theft authentication result from the chassis electronic control unit; and control whether to limit power transmission of a transmission and whether to enable a safety limit power transmission function based on the anti-theft authentication result.

16. The vehicle anti-theft system of claim 15, further comprising:

a powertrain electronic control unit configured to:

write the PIN and the secret key parameters from the vehicle electronic anti-theft system to the powertrain electronic control unit;

receive the anti-theft authentication result from the chassis electronic control unit; and control whether to limit power output of an engine and whether to enable a safety limit power transmission function based on the anti-theft authentication result.

17. A vehicle comprising the vehicle anti-theft system of claim 14.

* * * * *